Patented Mar. 7, 1933

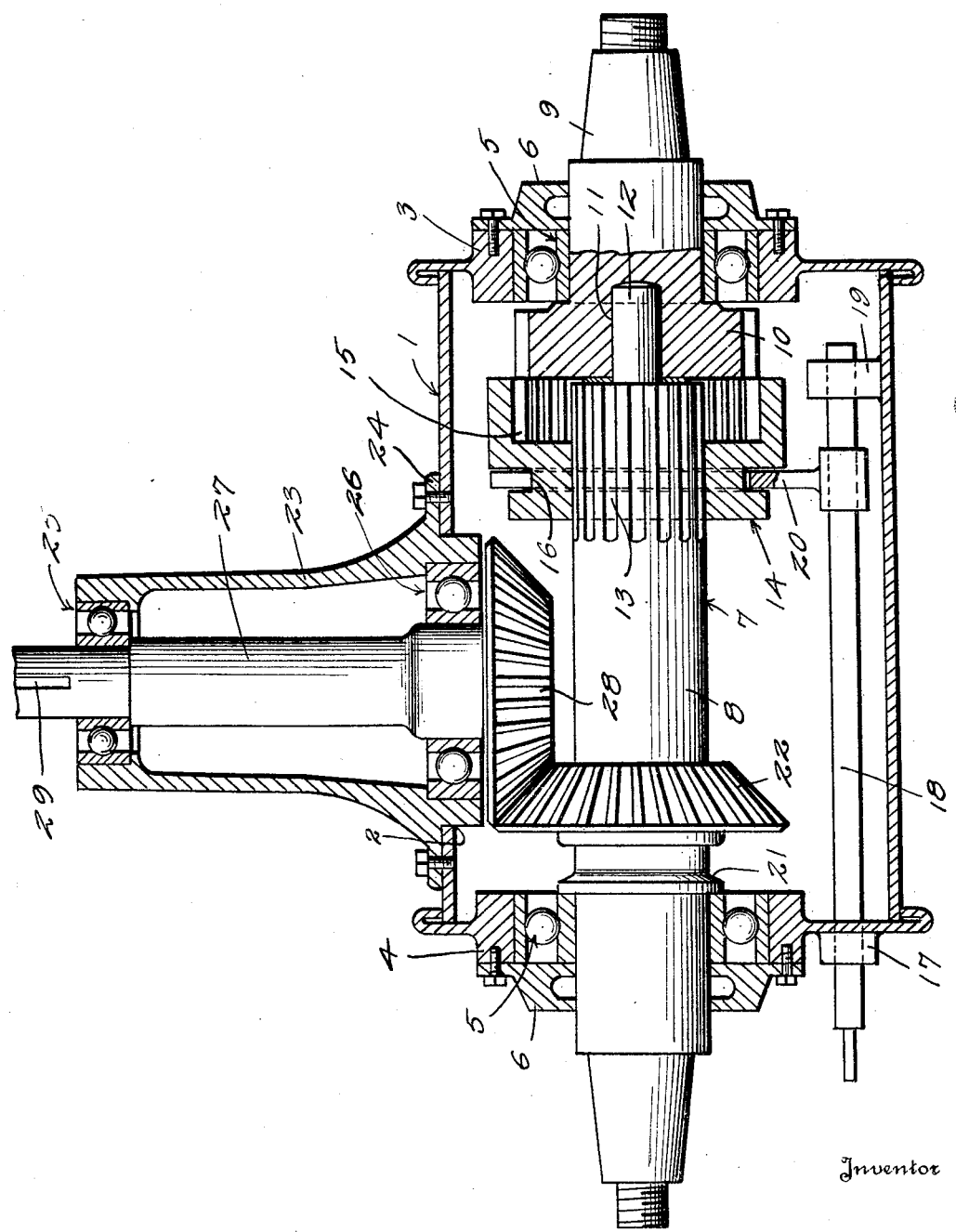

1,900,415

UNITED STATES PATENT OFFICE

GEORGE A. FULLERTON, OF CLARENDON, PENNSYLVANIA

POWER TAKE-OFF FOR MOTOR VEHICLES

Application filed October 13, 1931. Serial No. 568,593.

This invention relates to power mechanisms and pertains particularly to a mechanism for taking power from the driving shaft of a motor vehicle.

The primary object of the present invention is to provide a device which may be interposed in the drive shaft of a motor vehicle of any character, from which the power may be conveniently taken off for transferal through a belt pulley or gear mechanism of any suitable character to an independent machine, as desired by the operator of a motor vehicle.

Another object of the invention is to provide a mechanism having novel means for disconnecting the same from the portion of the drive shaft with which it is connected, which runs to the rear or driving wheels of the motor vehicle.

A still further object of the invention is to provide a power take-off mechanism which is designed to form a small compact unit which may be installed in a motor vehicle without taking up an excessive amount of room or necessitating excessive alterations in the construction of the same.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

The figure is a longitudinal sectional view through the power take-off mechanism embodying the present invention.

Referring now more particularly to the drawing wherein like numerals of reference indicate corresponding parts throughout the several views, the numeral 1 indicates generally the gear casing of the present power take-off device, which is provided in one side wall with an opening 2 and which has its ends closed by the heads 3 and 4.

Each of the heads 3 and 4 has a central opening therethrough in which is fitted a roller or ball bearing unit 5 and these head openings are covered by the centrally apertured head plates 6 which maintain the bearing units in place.

Extending longitudinally through the casing 1 is a shaft unit which is indicated generally by the numeral 7 and which includes a shaft section 8 and a stub section 9. The stub shaft section 9 extends through the head plate 6 of the head 3 and is coupled in any suitable manner with the portion of the motor vehicle drive shaft which leads to the rear or driving wheel while the outer end of the shaft portion 8 is coupled with that portion of the motor vehicle drive shaft which leads from the engine. The stub shaft section 9 has formed integral with its inner end, the gear 10 which is located within the casing as shown, in close proximity to the adjacent bearing unit 5 and this stub shaft has a central longitudinal bore 11 formed in the inner end to receive the longitudinally extending stem 12 formed integral with the inner end of the longer shaft section 8.

The inner end of the shaft section 8 is provided with the spline or key flutes 13 for the reception of suitable keys which slidably maintain thereon the unit 14 which comprises an integral gear 15 and a shifting yoke collar 16. This unit 14 when shifted in one direction on the shaft section 8 moves the integral gear over and into mesh with the gear 10 so as to secure the two gear sections in operative relation.

The head 4 which is directed toward the forward end of the motor vehicle in which the power take-off is mounted, is provided with a guide sleeve 17 through which is slidably extended the internal gear shifting stem 18, the inner end of which is supported by a suitable guide 19 mounted on the inner wall of the casing 1. This rod 18 carries the fork 20 which engages the collar 16 so as to effect the shifting of the collar on the shaft section 8 to permit the free rotation of the same.

The shaft section 8 carries a collar 21 which bears against the bearing unit in the head 4 and thus prevents the longitudinal movement of the shaft section and adjacent this collar there is mounted on this shaft section the beveled gear 22.

Secured to the casing 1 and overlying the opening 2 in the wall thereof, is one end of a laterally directed take-off stub shaft enclosing sleeve 23. This sleeve is flanged at its inner end as indicated at 24 for convenient attachment to the casing and at its outer end has positioned therein the bearing unit 25. The inner end of the sleeve also carries a bearing unit which is indicated by the numeral 26 and extending through this sleeve and through the two units 25 and 26 is a stub shaft 27 which carries at its inner end, within the casing 1, the beveled gear 28 which is permanently meshed with the gear 22.

The outer end of the power take-off shaft 27 is reduced before passing through the bearing unit 25 and is thus held by the unit against longitudinal movement and this reduced outer end may be provided with a keyway 29 for the reception of a suitable key (not shown) by which a belt pulley or gear may be secured to the stub shaft.

From the foregoing description it will be readily seen that a power take-off unit embodying the present invention may be installed in the drive shaft of a motor vehicle, the portion 7 of the unit constituting a part of the vehicle drive shaft, and by shifting the rod 18 the engine of the vehicle may readily be disconnected from the drive wheels so that the speed change mechanism of the motor vehicle may be left in gear and the engine operated to rotate the laterally directed power take-off 27 without affecting the driving wheels of the motor vehicle.

Having thus described the invention, what is claimed is:—

A power take-off device for a motor vehicle, comprising an elongated housing having a head at each end, a bearing mounted in each head, said housing having an opening through the side wall thereof, a shaft mounted in one bearing and extending longitudinally into the housing and terminating at its inner end in a central longitudinally extending pin, a stub shaft mounted in the other of said bearings and formed at its inner end within the housing to provide an integral gear, an internal gear slidable on said first shaft to mesh with said gear when moved to one position, the said pin being rotatably mounted in the adjacent end of the stub shaft, a guide element mounted upon the inner wall of the housing, a bearing guide formed through one of said heads, a bar slidably mounted in said bearing guide and said guide element and extending to the exterior of the housing, a fork carried by said bar and engaging said internal gear, a sleeve having a flange thereabout inwardly of one end and having the said one end extended through the opening in the housing wall, the said flange being secured to the housing wall, a lateral shaft extending through said sleeve, bearings mounted in the ends of said sleeve and supporting said lateral shaft, a beveled gear upon said lateral shaft within said housing and a beveled gear upon the first mentioned shaft and permanently in mesh with the other beveled gear, the said first shaft and stub shaft being formed at their outer ends to facilitate their connection in the drive shaft of a motor vehicle.

In testimony whereof I hereunto affix my signature.

GEORGE A. FULLERTON.